United States Patent Office 3,493,049
Patented Feb. 3, 1970

3,493,049
PRESSURE PULSING OIL PRODUCTION PROCESS
Robert R. Matthews and Howard H. Ferrell, Ponca City, Okla., assignors to Continental Oil Company, Ponca City, Okla., a corporation of Delaware
No Drawing. Filed Jan. 15, 1968, Ser. No. 699,013
Int. Cl. E21b 43/00, 43/16, 43/26
U.S. Cl. 166—263          11 Claims

ABSTRACT OF THE DISCLOSURE

A cyclic oil recovery process wherein there is injected into a subterranean formation via an injection well a gas flooding medium if the formation fluids do not contain a substantial amount of dissolved gas, an aqueous flooding medium, and a concentrated oxidizing agent, following which the injection well is made a production well.

BACKGROUND OF THE INVENTION

Field of the invention

This invention relates to a process of oil recovery from subterranean formations. More particularly, the invention relates to a secondary recovery process of oil recovery wherein more oil is withdrawn from normally unproductive sections of highly fractured formations or those of a nonhomogeneous character, e.g., having a widely varying permeability.

Description of the prior art

Oil is often withdrawn from a reservoir in a nonuniform manner. That is, most of the oil is produced from the more easily drainable sections of the formation, and relatively little oil comes from the less easily drainable sections. This is especially true in highly fractured reservoirs or those having sections of widely varying permeability wherein much valuable oil is left in the less accessible portions of the reservoir. In such reservoirs an ordinary secondary recovery flooding treatment is often of limited value, as the injected fluid tends to sweep or pass through the same sections of the formation which are susceptible to good drainage, thus either bypassing or entering to only a limited extent those sections of the formation which cannot be readily drained.

In order to free more of the oil in these inaccessible parts of the reservoir, there has developed a pressure pulse flooding process wherein a fluid such as either water or hydrocarbon gas is injected, by way of an injection well, into a partially depleted reservoir to raise the pressure to approximately the original reservoir pressure or above. The reservoir is then produced, and the reservoir pressure decreases. When water is the injected flood medium, it is postulated that water is imbibed into the pores of the tighter, less accessible portions of the reservoir. During the depressuring portion of the cycle when the reservoir is produced, there is a capillary retention of water in these pores and a release of the formerly trapped oil which is free to move from the rock matrix into fractures and/or zones of higher permeability from which it can be more readily produced. In pressure pulse flooding using a hydrocarbon gas as the flooding medium, referred to as batch gas cycling, it is believed that the increased pressure allows the gas to flow into the less permeable zones of the reservoir as well as the more permeable zones where it partially dissolves in the oil. During periods of production, the reservoir pressure is reduced, the reservoir fluids expand, some gas comes out of solution and reservoir fluids tends to flow from all portions of the reservoir toward the producing wells. This results in a more efficient sweep of the total reservoir.

However, pressure pulsing processes as previously carried out have not been entirely successful. It has generally been the experience that even though a substantial volume of oil is recovered by one cycle of repressuring and producing, oil recovery drops off sharply during the second and subsequent cycles.

It is also known to inject various acids into wells in various manners to improve production, although not in connection with any pressure pulsing technique. For example, a sulfonating agent such as $SO_3$ has been injected into formations containing liquid hydrocarbons having a high percentage of aromatics to form in situ a surfactant. The sulfonating agent is followed by injection of a secondary recovery drive fluid such as water or a gas. It is also known to aerate an acidizing solution with an inert gas such as nitrogen so as to decrease the weight of the fluid column in the well following treatment and allow the well to be more easily unloaded.

It is an object of this invention to provide an improved pressure pulsing oil recovery process. It is a further object to provide such a process which is effective for a plurality of cycles. It is another object to provide such a process which is operable, utilizing the same well for both fluid injection and fluid production. It is still another object to provide a cyclic secondary recovery process wherein all wells penetrating a reservoir are employed as production wells during the production part of the cycles. It is still another object to provide an improved pressure pulsing process wherein an injected fluid reacts with the formation hydrocarbons to increase production of said hydrocarbons.

SUMMARY OF THE INVENTION

The above and related objects, advantages, and features of this invention may be achieved by a process wherein oil is recovered from a nonhomogeneous subterranean formation or reservoir which may be partially depleted, said formation being penetrated by one or more wells. First, the reservoir hydrocarbons are examined to determine the amount of gas present and the amount of gas dissolved in the oil under reservoir conditions. Next, the reservoir pressure in the drainage area of a well is raised to force a substantial amount of the gas in the formation into a highly compressed state or into solution in the well fluids by:

(a) if the reservoir oil contains a substantial amount of dissolved gas which will come out of solution as the oil is produced, injecting into the formation an aqueous flooding medium and a concentrated oxidizing agent; or (b) if the reservoir oil does not contain a substantial amount of dissolved gas, injecting into the formation a gas flooding medium, an aqueous flooding medium, and a concentrated oxidizing agent.

The pressured reservoir is produced to the economic limit. The cycle is repeated to recover additional oil using gas, an aqueous flooding medium, and a concentrated oxidizing agent in the pressuring step.

DESCRIPTION OF THE PREFERRED EMBODIMENT

Most oil bearing reservoirs or formations contain at least some sections which tend to retain oil more tightly than other sections. For example, the formation may contain many natural or induced fractures, interconnected vugs, solution channels, hetergeneous lenses or networks of large pore size material dissecting smaller pore size, or is otherwise nonhomogeneous. The area in the immediate vicinity of these fractures or other discontinuities will generally drain more easily than areas more remote from the fractures. Also, sections with a higher permeability and/or porosity will drain better than those with a lower permeability and/or porosity. The process of this invention is especially operable with any such formation which contains sections from which oil can be removed to only a negligible extent by either primary or secondary recovery techniques.

Although there is nothing to preclude the use of the process of this invention on newly drilled or previously unproduced reservoirs, it should be most helpful in treating partially depleted reservoirs, e.g., those from which some oil has been produced and the reservoir pressure declined or those which are ready for some sort of secondary recovery process.

Most reservoirs are penetrated by a plurality of wells. In carrying out the process of this invention it is contemplated that the entire reservoir can be alternately pressured and depressured by utilizing one or more wells as injection wells during the pressuring steps, and then shutting in these injection wells while using one or more other wells as production wells during the depressuring steps. In a preferred embodiment, one or more wells are utilized first as injection wells to pressure up only that portion of the reservoir that constitutes the drainage area of these wells. Subsequently, these same wells are converted to production wells during the following production step. This is in contrast to previously known secondary recovery procedures wherein one portion of the wells is utilized for injecting a driving fluid and another portion of the wells is utilized for production. Thus, the process of this invention has the advantage of employing all wells as production wells.

In determining the character of the fluid to be used in the initial pressuring step, the nature of the reservoir hydrocarbons at reservoir conditions must be considered. For example, an aqueous fluid and a concentrated oxidizing agent may be used if the reservoir pressure is still relatively high or if the reservoir hydrocarbons contain a substantial amount of gas or dissolved gas which, upon further lowering of the pressure, will come out of solution and serve as an expulsive force to help move the oil to the production well. However, gas as well as an aqueous fluid and a concentrated oxidizing agent should be utilized if the reservoir hydrocarbons consist mostly of dead oil, that is contain no substantial amount of dissolved gas, or if the reservoir pressure is low. In any event, for the second and subsequent pressuring step following a production or depressuring step, all three components, i.e., a gas, an aqueous fluid, and a concentrated oxidizing agent, should be used as the pressuring fluid.

In carrying out the pressuring step using both an aqueous fluid and an oxidizing agent, or these two components plus a gas, the order of injection of the fluids is optional. They can be added simultaneously in a series of alternate slugs or in any desired order. It is preferred that at least a substantial part of the gas be injected before all the aqueous fluid is injected. In an especially preferred embodiment, the gas is injected first followed by concentrated oxidizing agent and then the aqueous fluid.

The volume of gas injection during the pressuring step can be as high as the equivalent of 25 percent of the reservoir free gas volume at the start of the pressuring step or as low as 2.5 percent. Any amount of gas injection preceding the aqueous fluid injection will improve oil recovery from the process, and the actual volume used will depend primarily on the economics.

The volume of oxidizing agent injected during the pressuring step can range from about 1 percent of the reservoir pore volume to about 10 percent of the reservoir pore volume. At less than 1 percent of the pore volume the increase in oil production attributable to this component becomes negligible. At more than 10 percent of the pore volume, additional oxidizing agent yields a negligible further increase in oil production.

It is desired to inject enough aqueous fluid during the aqueous fluid injection part of the pressure step to reduce the free gas saturation to zero. It is not always possible to reduce the free gas saturation to zero as in the case where inert or nonsaturable gas is used. In other uses the maximum safe operating pressure may be reached before the gas saturation is reduced to zero. Normally, the volume of aqueous fluid required will be approximately $1.2 \times N_p \times Bo_2$, where $N_p$ is the cumulative volume of stock tank oil previously produced from the well and $Bo_2$ is the formation volume factor at the beginning of the pressuring step. Generally, an amount of aqueous fluid of from one-tenth to one-half of the reservoir pore volume is satisfactory to reach the desired pressure.

The total pressure increase due to gas, aqueous fluid, and concentrated oxidizing agent injection should be sufficient to cause a substantial portion of the gas present in the formation to go into solution in the oil. A preferred pressure increase is that about equal to the original reservoir pressure before production of any fluids.

Following the pressurizing step, the same wells are depressured, i.e., produced. Depressuring can be started immediately following pressurizing. However, it is preferred that the well be shut in for a few days before starting the depressuring part of the cycle. During this shut-in time it is believed that the oxidizing agent has greater opportunity to react with the formation oil and the aqueous fluid more completely displaces oil from the tighter sections of the formation. Thus, the oil migrates to the larger pores from which it can be more easily produced.

During the depressuring or production step following a pressuring step, the formation is produced until the pressure falls to any low pressure desired, consonant with economic operation of the process, considering (1) the amount of fluid needed to bring the reservoir back to high pressure for the subsequent cycle, (2) the rate of production, and (3) the gas-oil ratio. These considerations are all realted to the economy of the process and therefore constitute an operating decision. Generally, a pressure of about 100 p.s.i. below the bubble point of the reservoir hydrocarbons is satisfactory. The cycle is then repeated.

The pressuring-depressuring cycle is repeated for as many times as oil can be economically recovered. Generally, from 1 to 10 cycles can be carried out before oil production during the depressuring step falls to such a low level that additional cycles are not profitable.

The gases which may be employed as a pressuring medium include those materials which are gases at the reservoir conditions existing at the close of a depressuring step. The materials may be gases or liquids under the reservoir conditions existing at the close of the pressuring step, but if liquids, they must gasify during the depressuring step. Normally gaseous hydrocarbons such as natural gas, methane, ethane, propane, and liquefied petroleum gas may be used. These gases are soluble in the reservoir oil under some reservoir conditions. Other materials which may be used include gases other than hydrocarbons which may or may not be appreciably soluble in the reservoir oil such as nitrogen, oxygen, carbon dioxide, combustion gases, ammonia, and sulfur dioxide.

The concentrated oxidizing agents which may be employed are those materials which will oxidize a portion of the formation hydrocarbons. They include nitric acid, perchloric acid, aqueous solutions of alkali metal permanganates and perchlorates and the sulfonating acids and anhydrides such as sulfur trioxide, aqueous sulfuric acid, fuming sulfuric acid, chlorosulfonic acid, and fluorosulfonic acid. The sulfonating acids, especially aqueous sulfuric acid, are preferred. The oxidizing agent must be concentrated, i.e., above 90 percent by weight acid, to be effective. While the reactions which take place between the oxidizing agent and the formation hydrocarbons are complex and not well understood, it is believed some of the principal effects are formation of gaseous products, such as carbon dioxide, hydrogen sulfide, sulfur dioxide, and the like, from liquid hydrocarbons and swelling of liquid hydrocarbons.

The aqueous flooding media which may be employed as a pressuring medium include liquid fresh water, brine, or steam. For formations containing swellable clays which are sensitive to fresh water, brine may be used or any of the well-known additives for controlling clay swelling may be added to the water.

It is preferred to include a surface active agent in the aqueous fluid to aid capillary retention of aqueous fluid and to aid imbibition. Any of the water soluble surface active agents may be used which increase the water-wettability of the formation matrix. Examples are ammonium or sodium salts of alkyl aryl sulfonates, salts of ether sulfates, quaternary ammonium salts, and ethylene oxide derivatives.

EXAMPLES

Oil recovery tests were made using rectangular slabs of Berea sandstone measuring 12 inches by 12 inches by 2 inches and having a permeability of approximately 200 md. Each of the four lateral surfaces of the slab was scribed with five equally spaced longitudinal groove 1/16 inch deep and four equally spaced transverse grooves 1/16 inch deep. The lateral surfaces were then covered with a thin walled steel plate having a height approximately 1/2 inch less than the height of the lateral surface. The steel plate abutted the entire scribed lateral surface of the slab except at one corner thereof where an extension of the steel plate provided a space between the lateral surface and the steel plate sufficiently large to accommodate a 1/4 inch diameter tubing fitting. The edges of the steel plate were then bonded to the slab with epoxy resin. In the center of the top face of the slab was drilled a 1/4 inch diameter vertical hole to within 1/4 inch of the bottom face. A 1/4 inch diameter tubing fitting was positioned in this hole and sealed into position with epoxy resin. All exposed surfaces of both the slab and steel plates were then covered with a layer of epoxy resin about 1/4 inch thick. This left the tubing fitting in the center of the top of the slab and the tubing fitting in the steel plate at one corner of the slab as the only points of contact with the slab. The resulting assembly was placed in a high pressure bomb with tubing attached to each of the two tubing fittings extending outside the bomb. The bomb was filled with oil and pressured up to 500 p.s.i. The slab was saturated with an aqueous brine containing 50,000 p.p.m. sodium chloride by attaching a vacuum pump to the tubing in communication with the lateral surfaces of the slab and pumping the brine into the slab by way of the tubing in communication with the center of the slab. The path of fluid flow was through the tubing into the center of the slab, out to each of the four lateral surfaces, through the grooves between the lateral surfaces and the steel plate to the tubing attached to the corner of the slab and out of the assembly. Flow of brine was continued until the flow of fluid out of the slab was the same as that into the slab, indicating the slab was saturated with brine. The pressure on the brine was gradually raised to 300 p.s.i. during this step. The amount of brine in the slab was then reduced to the irreducible level by pumping through the slab over a 24-hour period about six pore volumes of a synthetic reservoir oil comprising 80° pale oil having a boiling range of 274 to 540° C. at 10 mm. pressure and an API gravity of 34 saturated with ethane gas at 25° C. and 300 p.s.i. This synthetic reservoir oil was prepared by contacting 80° pale oil with ethane gas for 24 hours in a separate rocking bomb. Thus, the synthetic reservoir oil had a bubbling point pressure of 300 p.s.i. The slab was slowly depressured from 400 p.s.i. to 100 p.s.i. over a 24-hour period by allowing the fluids to flow from the tubing in communication with the corner of the slab. The amount of oil produced was measured and reported as primary production percent of the pore volume.

Three slabs were prepared in the above-described manner. The process of the instant invention was carried out using slab A which had a primary oil production of 11.2 percent pore volume. Slab A was repressured to 400 p.s.i. by injecting 4.5 percent pore volume of nitrogen as the gas flooding medium, 10.7 percent pore volume of the above-described brine as the liquid aqueous flooding medium and 2.8 percent pore volume of 96.5 percent sulfuric acid as the concentrated oxidizing agent. Slab A was then depressured to 100 p.s.i. The oil produced during this step was 85.0 percent primary oil production.

Using slab B, which had a primary oil production of 17.4 percent pore volume, a similar process was carried out except that no concentrated oxidizing agent was used in the repressuring step. Repressuring was carried out by injecting 24.1 percent pore volume of nitrogen and 19.5 percent pore volume of brine. Oil produced during the depressuring step was only 57.7 percent primary oil production.

Using slab C, which had a primary oil production of 11.2 percent pore volume, a similar process was carried out except that no liquid aqueous flooding medium was used in the repressuring step. Repressuring was carried out by sequentially injecting 2.8 percent pore volume nitrogen, 5.6 percent pore volume 96.5 percent sulfuric acid, and 13.5 percent pore volume additional nitrogen. Oil produced during the depressuring step was a low 9.0 percent primary oil production.

These three tests show that the process of the instant invention, i.e., repressuring with a gas flooding medium, a liquid aqueous flooding medium, and a concentrated oxidizing agent, results in substantially greater additional oil recovery than similar processes in which was used only a gas flooding medium plus either a liquid aqueous flooding medium or a concentrated oxidizing agent, but not all three repressuring components. Similar results were obtained using other concentrated oxidizing agents, such as nitric acid, chlorosulfonic acid, or an aqueous solution of potassium permanganate.

WELL EXAMPLE

A Wyoming subterranean reservoir is a highly fractured fossiliferous silt stone. The producing formation anticlinal structure and the production near the crest of the anticline, where fracturing is more intense, has been much higher. Some wells in the crested area having produced nearly 1/2 million barrels oil, but the producing rate has declined from 300 barrels per day, originally, to only a few barrels per day. The unfractured silt stone has a porosity of about 12 percent and no measurable permeability. It is considered uneconomical to continue production; in fact, many wells have been shut in. Usually when the primary energy is depleted, water injection is started in order to restore the energy and insure the producing rates. But in this case, until we developed the concept in this invention, it had been decided to plug and abandon the remaining producing wells rather than risk a costly waterflood failure.

It is desired to treat the producing wells in the anticlinal crestal area according to the secondary recovery process of this invention. In this first step the drainage area of these wells is to be pressured up to about 1000 p.s.i. by injecting 18 million standard cubic feet (45,000 barrels gas at 1000 p.s.i.) of inert gas and 30,000 barrels of concentrated (>90 percent) sulfuric acid followed by 125,000 barrels of brine water. It is expected that the total injection time will take about 6 months.

In the second step the wells are to be returned to production. The wells are expected to produce only water at a rate of about 300 barrels per day for about 3 months. After this time, the wells are expected to begin producing oil along with the water. After oil first appears the ratio of oil to water will gradually increase. Production will continue for about 7 years from the time water injection ceases. At the end of this time the wells should be averaging about 5 barrels oil per day and 0 barrels water per day. The formation pressure is expected to have dropped to about 300 p.s.i.

The cycle will be repeated. The second and subsequent cycles will become less and less efficient, producing less oil and more water with each subsequent cycle. Therefore, the number of cycles will depend upon economic considerations.

Although various embodiments of the invention have been described, it will be understood, of course, that the invention is not limited thereto, but many modifications may be made in process conditions without departing from the spirit and scope of the invention. The examples are given by way of illustration only, and the invention is limited only by the terms of the appended claims.

We claim:

1. Method of recovering oil from a nonhomogeneous partially depleted subterranean formation penetrated by one or more wells comprising:
    (a) injecting into said formation via an injection well a gas flooding medium, liquid aqueous flooding medium, and a concentrated oxidizing agent to increase the formation pressure within the drainage area of the injection well to force into solution a substantial part of the free gas present in the formation; and
    (b) thereafter producing the formation via a production well.

2. The method of claim 1 wherein the injection well and the production well are the same.

3. The method of claim 1 wherein at least a substantial part of the gas injected is injected before injecting the liquid aqueous flooding medium and concentrated oxidizing agent.

4. The method of claim 1 wherein the gas is a normally gaseous hydrocarbon.

5. The method of claim 1 wherein the formation oil is dead oil.

6. The method of claim 5 wherein the oxidizing agent is a sulfonating acid.

7. The method of claim 1 wherein the oxidizing agent has a concentration of at least 90 percent.

8. The method of claim 6 wherein the sulfonating acid is sulfuric acid.

9. The method of claim 8 wherein the oxidizing agent is a sulfonating acid or anhydride.

10. Method of secondary recovery of oil from a partially depleted nonhomogeneous subterranean formation utilizing a single well by increasing the formation pressure within the drainage area of said well to force into solution a substantial part of the free gas present in the formation comprising:
    (a) injecting a slug of gas into the formation comprising from 2.5 to 25 percent of the reservoir free gas volume;
    (b) injecting into the formation a slug of oxidizing agent having a concentration of at least 90 percent comprising from 1 to 10 percent of the reservoir pore volume;
    (c) injecting a slug of water into the formation comprising from one-tenth to one-half reservoir pore volumes; and
    (d) thereafter producing the well.

11. Method of secondary recovery of oil from a partially depleted nonhomogeneous solution drive reservoir penetrated by at least one well comprising:
    (a) injecting into the reservoir via a well a slug of a liquid aqueous flooding medium to raise the reservoir pressure in the drainage area of said well to a value at which a substantial part of the free gas present in the drainage area has gone into solution in the oil;
    (b) producing this same well to the economic limit;
    (c) injecting into the reservoir via this same well a gas flooding medium, a concentrated oxidizing acid, and a liquid aqueous flooding medium to raise the reservoir pressure in the drainage area of said well to a value at which a substantial part of the free gas has gone into solution; and
    (d) producing this same well to the economic limit.

References Cited

UNITED STATES PATENTS

| 3,138,204 | 6/1964 | Richardson | 166—9 X |
| 3,167,119 | 1/1965 | Meadors | 166—9 |
| 3,259,187 | 7/1966 | Prats et al. | 166—38 X |
| 3,333,637 | 8/1967 | Prats | 166—2 X |
| 3,398,791 | 8/1968 | Hurd | 166—38 X |

STEPHEN J. NOVOSAD, Primary Examiner

U.S. Cl. X.R.

166—271, 272, 273, 274, 275